United States Patent [19]

Shekhawat et al.

[11] Patent Number: 4,969,081
[45] Date of Patent: Nov. 6, 1990

[54] INVERTER SWITCH CURRENT SENSOR WITH SHOOT-THROUGH CURRENT LIMITING

[75] Inventors: Sampat S. Shekhawat; Chai-Nam Ng; P. John Dhyanchand, all of Rockford, Ill.

[73] Assignee: Sundstrand Corporation, Rockford, Ill.

[21] Appl. No.: 294,352

[22] Filed: Jan. 9, 1989

[51] Int. Cl.$^5$ ............................ H02M 7/5387
[52] U.S. Cl. ............................ 363/56; 363/132
[58] Field of Search .................... 368/56, 98, 132; 361/93; 323/357, 358

[56] References Cited

U.S. PATENT DOCUMENTS

| Re. 31,840 | 2/1985 | Harris et al. | 363/97 |
| 1,971,207 | 8/1934 | Boyajian et al. | 323/358 |
| 3,308,370 | 3/1967 | Britten et al. | |
| 4,002,963 | 1/1977 | Hunter | |
| 4,198,595 | 4/1980 | Mikovic | 323/357 |
| 4,542,440 | 9/1985 | Chetty et al. | 361/111 |
| 4,584,635 | 4/1986 | MacInnis et al. | 363/25 |
| 4,609,832 | 9/1986 | Mehl | 307/270 |
| 4,636,929 | 1/1987 | Nakamura et al. | 363/56 |
| 4,717,994 | 1/1988 | Diaz et al. | 363/56 |

FOREIGN PATENT DOCUMENTS

| 80164 | 5/1984 | Japan | 363/56 |
| 1365307 | 1/1988 | U.S.S.R. | |

Primary Examiner—William H. Beha, Jr.
Attorney, Agent, or Firm—Wood, Phillips, Mason, Recktenwald & Vansanten

[57] ABSTRACT

The problem of sensing current through inverter switches is solved by a current transformer which has windings connected with the flyback diodes to demagnetize or reset the current transformer core. Size and weight of the transformer are minimized while avoiding a buildup of flux which would saturate the core.

2 Claims, 2 Drawing Sheets

INVERTER SWITCH CURRENT SENSOR WITH SHOOT-THROUGH CURRENT LIMITING

FIELD OF THE INVENTION

This invention relates to a current sensor for the switch current of a DC to AC inverter.

BACKGROUND OF THE INVENTION

Inverter circuits are used to convert DC to AC power. For example, in a variable speed, constant frequency (VSCF) electrical system as may be used in an aircraft, variable frequency AC power is rectified and the DC converted to fixed frequency AC. Typically, semiconductor switches, as power transistors, are used in the inverter circuit.

It is desirable to monitor the switch current of an inverter to provide information for control functions. It is known to use a current transformer for sensing the switch current. See, for example, Mehl U.S. Pat. No. 4,609,832, FIG. 2, and Chetty et al. U.S. Pat. No. 4,542,440, FIG. 4. Mehl senses switch current to control an incremental base drive for a transistor switch of an inverter. Chetty has separate current transformers for each switch. It is also known to use a single current transformer for both inverter switches as shown in Hunter U.S. Pat. No. 4,002,963. This reduces the number of parts and circuit connections.

A problem sometimes encountered in an inverter circuit is a "shoot-through" condition in which both switches conduct at the same time. The switches form a short circuit across the DC power source and the current is excessive, often destroying the switches. The inductance of the primary windings of the current transformers limits the transient current and can avoid switch damage. In Hunter, however, the two primary windings are oppositely poled, the flux in the current transformer cancels and there is insufficient inductance to limit the current.

BRIEF SUMMARY OF THE INVENTION

A principal feature of the invention is the provision of an inverter switch current sensor having a current transformer with a core of magnetic material, first and second primary windings on the core each connected in series with one of the switches and poled so that current through each switch establishes flux of the same sense in the core, and a secondary winding on the core for developing an output signal.

Another feature of the invention is that the inverter has first and second flyback diodes, one connected in shunt with each switch to conduct current in the opposite sense to the shunt switch, with third and fourth primary windings on the transformer core, each being connected in series with one of the flyback diodes and poled so that the flyback current establishes flux in the core of the sense opposite the switch current flux. This reduces remanent flux in the transformer core from the inverter switch currents so that the core does not saturate in a shoot-through condition.

DETAILED DESCRIPTION

The inverter switches in an aircraft VSCF system may handle currents of the order of 600 amperes. Typically, each switch may be two or more power transistors connected in parallel.

Figure 1:
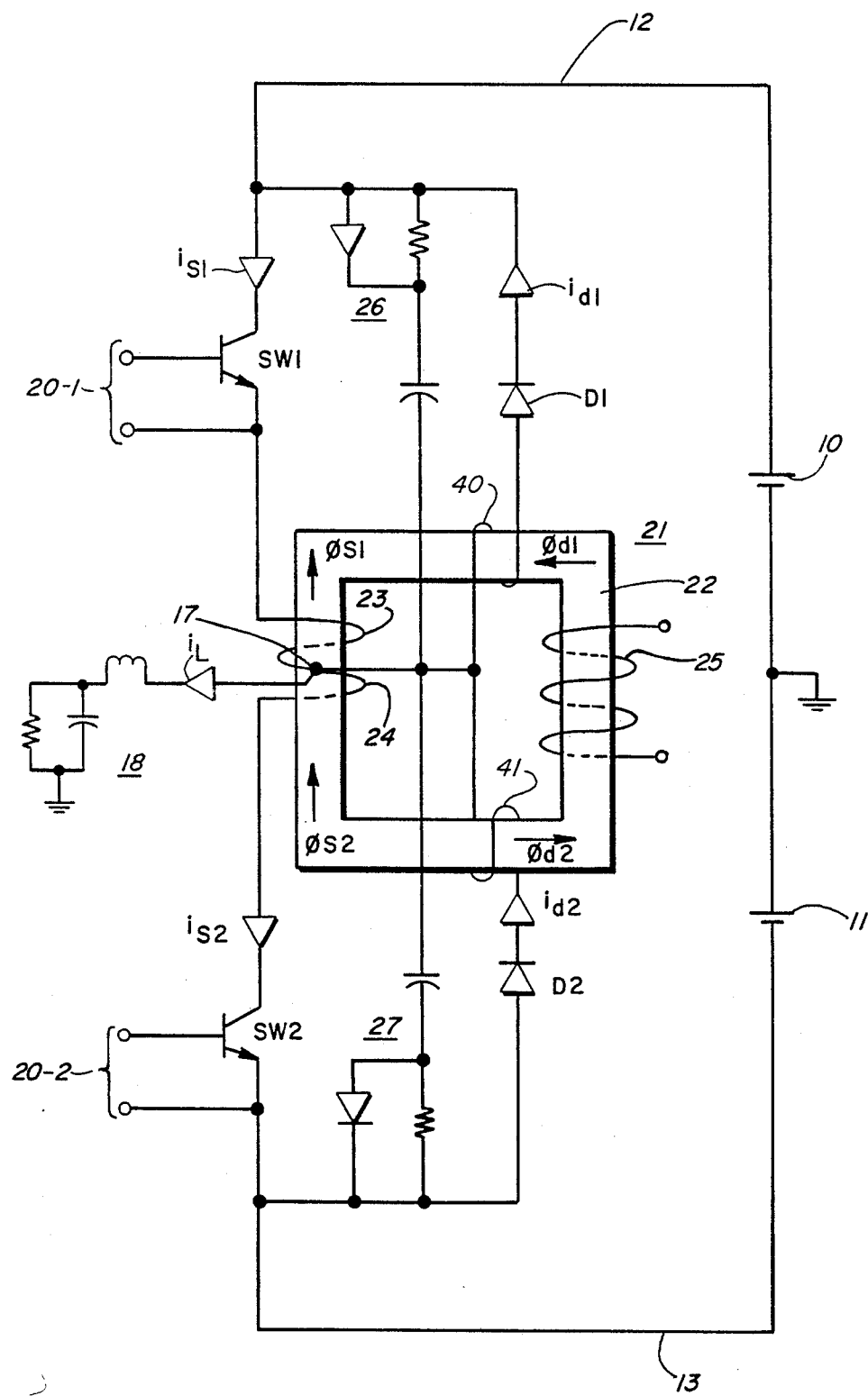
FIG. 1 is a schematic diagram of inverter switches and a current sensing transformer illustrating the invention.

The simplified inverter circuit shown in FIG. 1 has a DC source with two sections 10 and 11 connected in series between positive rail 12 and negative rail 13. The midpoint of the DC power source, between sections 10 and 11, is returned to a reference potential or ground 14. The DC power source may, in a VSCF system, be a three phase, full wave rectifier with a variable frequency input.

The inverter switches, here shown as single transistors sw1 and sw2 have emitter-collector circuits connected in series between positive rail 12 and negative rail 13. The currents $i_{S1}$ and $i_{S2}$ through the switches sw1 and sw2 have the direction indicated by the associated arrowheads. The junction 17 of the emitter of sw1 and the collector of sw2 is connected through filter 18 with an AC system load 19. The load circuit is completed to the DC source through ground 14. The load current $i_L$ has a positive sense in the direction of the associated arrowhead. The switches sw1 and sw2 are driven alternately by pulse waveforms connected with terminals 20-1 and 20-2 respectively.

Current transformer 21 has a core 22 of magnetic material, as a powdered iron ferrite. A first primary winding 23 is connected in series with the emitter-collector circuit of sw1 and junction 17. A second primary winding 24 is connected in series with the emitter collector circuit of sw2 and junction 17. The primary windings 23, 24 are poled so that the flux established in the transformer core 22 by the inverter switch currents $i_{S1}$, $i_{S2}$ have the same sense or direction. This is indicated by the arrows $\Phi_{S1}$ and $\Phi_{S2}$.

A secondary winding 25 has a signal developed therein which represents the inverter switch currents and may be connected with suitable control circuitry such as that shown in the Mehl and Chetty et al. patents. Multiple secondary windings could be used to provide output signals to different control circuits.

The inverter switches are driven by pulse width modulated signals to conduct alternately, as will be discussed in more detail below.

Connected in shunt with the inverter switches are flyback diodes D1 and D2 and snubber circuits 26, 27. The flyback diodes conduct current in the opposite sense to the inverter switches across which they are connected. The flyback diode circuits operate when the inverter has a reactive load to accommodate load current flow when the inverter switches are turned off. For example, with an inductive load, the load current lags the load voltage. When inverter switch sw1 conducts, a positive current $i_L$ flows through the load. When sw1 is turned off, the load current continues to flow through flyback diode D2. Similarly, when sw2 is turned off, the load current continues to flow through flyback diode D1. The snubber circuits 26 and 27 protect the associated inverter switches from the simultaneous occurrence of a high current and a high voltage on switch turnoff, as discussed in more detail in the Chetty et al. patent.

A shoot-through condition sometimes occurs in an inverter when both switches sw1 and sw2 conduct simultaneously, in a short circuit across the DC source 10, 11. The primary windings 23, 24 of the current transformer 21 act as series inductances to limit the shoot-through current to an acceptable level. The flux induced by the currents through the two primary windings are of the same sense and add. This is to be contrasted with the current transformer of the Hunter patent in which the primary windings have the opposite sense. In Hunter, the flux resulting from currents in a shoot-through condition cancels so that there is no inductance and the switches would likely be destroyed.

It is desirable to minimize the size and weight of the transformer core 22. However, it is necessary to avoid core saturation in order to develop the inductance which limits shoot-through current.

Figure 2:
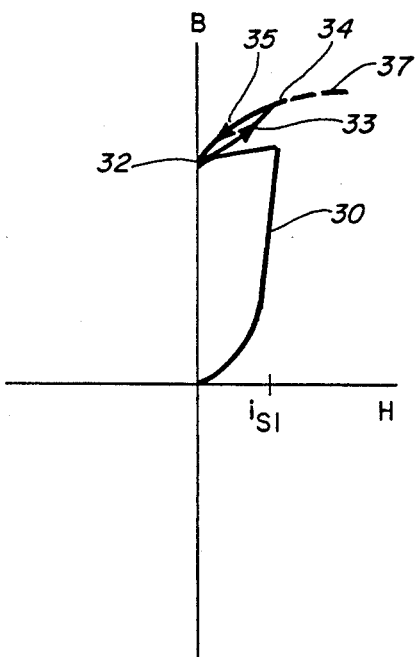
FIGS. 2 and 3 are B-H magnetization curves for the transformer core used in describing the invention.

The magnetization of the transformer core 22 with the switch circuit primary windings 23, 24 is illustrated in FIG. 2 for a typical core material. The induction B is plotted along the ordinate as a function of the magnetizing force H plotted along the abscissa. On the application of an initial current through one of the primary windings, the flux builds up in the core 22 along magnetizing curve 30 to a value indicated at point 31 for the current $i_{S1}$. As the current drops to zero at the end of the conduction of sw1, the flux drops to the value indicated at the point 32, representing the remanent flux in the magnetic circuit. With successive pulses of current through primary windings 23 or 24, the core is further magnetized along curve 33 to point 34 and demagnetized along curve 35 to point 32. If a shoot-through condition occurs, the magnetizing force is immediately doubled as the current flows through both primary windings 23 and 24. If this drives the core into saturation as indicated by broken line curve 37, the impedance of the circuit becomes very low and the current continues to increase until one or both of the switches sw1, sw2 fail.

Figure 3:
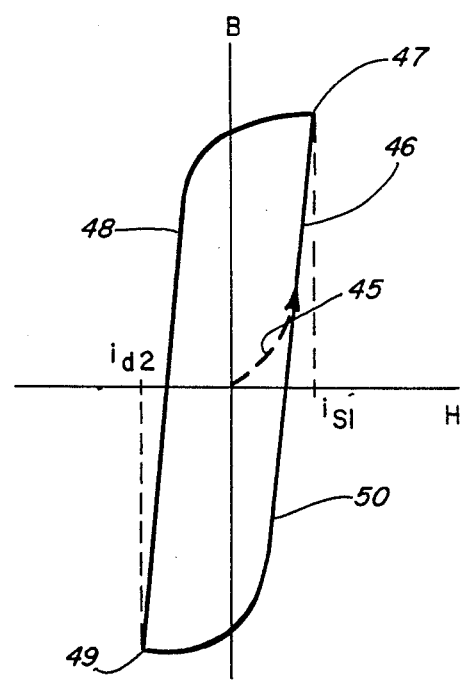

In accordance with the invention, however, the remanent flux in core 22 is dissipated by demagnetizing or resetting the core. This is achieved by providing third and fourth primary windings 40, 41 on transformer core 22 connected in series with the flyback diodes D1, D2, respectively. Windings 40 and 41 are poled so that the flyback currents $i_{d1}$ and $i_{d2}$ generate flux $\Phi_{d1}$ and $\Phi_{d2}$ of the opposite sense to the flux $\Phi_{S1}$ and $\Phi_{S2}$ from the switch current through primary windings 23 and 24. The magnetization curve of FIG. 3 illustrates the operation. Upon initial operation of the circuit, the core is magnetized along broken line curve 45 and curve 46 to the point 47 corresponding with a magnetizing force of the current $i_{S1}$. When switch s1 ceases conduction the load current $i_L$ continues to flow through diode D2. The core 22 is demagnetized along curve 48 and magnetized in the opposite sense to the point 49 corresponding with $i_{d2}$. Upon succeeding conduction of sw2, the core is demagnetized along curve 50 and remagnetized along curve 46 to the point 47. The transformer may be designed to accommodate a shoot-through condition without going into saturation as the core is reset by the successive current pulses.

Figure 4:
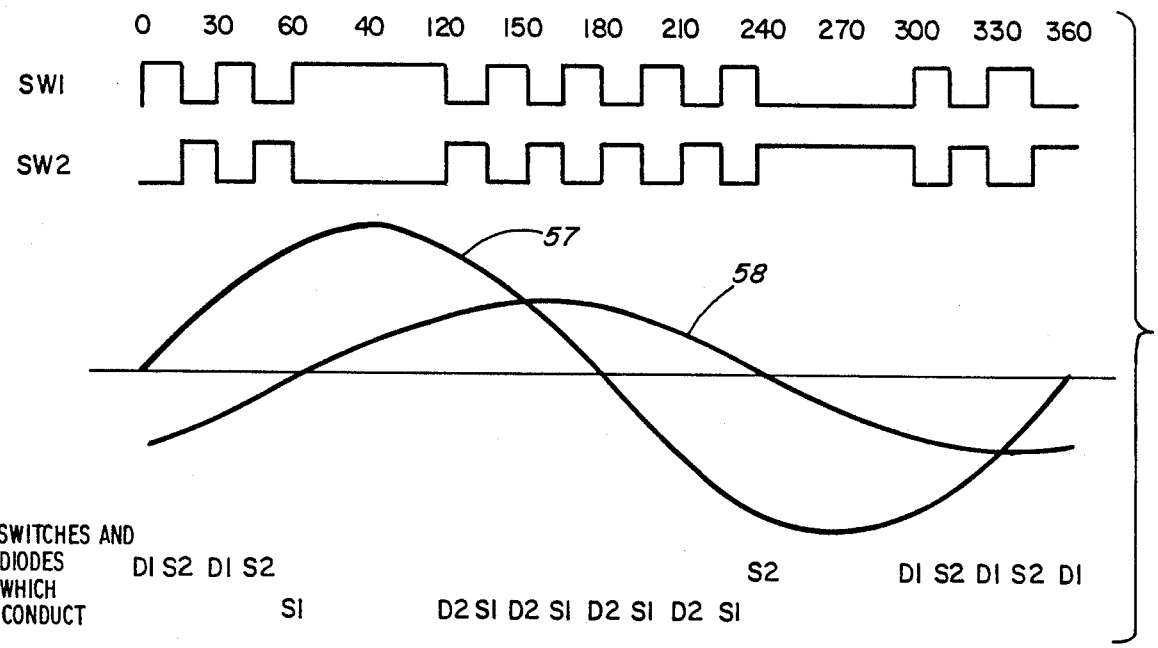
FIG. 4 is a series of wave diagrams and a table illustrating the conduction pattern for the switches and flyback diodes.

The operation of the circuit is further explained by considering the voltage and current waveforms and the conduction table of FIG. 4. Waveforms 55 and 56 represent pulse width modulated switch driving waveforms for sw1 and sw2, respectively. The waveforms represent one AC cycle of 360° as indicated by the angles 0, 30, 60 . . . at the top of the Figure. The load voltage is a sinewave 57 which is in phase with the inverter switch driving waveforms. The current waveform 58 is a sinewave which lags the voltage waveform by 60°, which is typical with an inductive load. At 0° sw1 is on and the load voltage curve 57 goes positive. However, the current 58 lags the voltage and is negative, flowing through flyback diode D1. At 15° sw1 is turned off and sw2 is turned on, conducting the negative current as indicated in the table below the waveforms. At 30° sw2 is turned off and sw1 turned on, but current continues to flow through diode D1, now sw1. At 60° sw1 is turned on and conducts load current. The switches continue to be turned on alternately with switches sw1 and flyback diode D2 conducting alternately until the current again goes negative at 240°.

Alternate conduction of the switches and flyback diodes repeatedly demagnetizes or resets the current transformer core 22.

We claim:

1. In a DC to AC inverter having a DC source, first and second alternately conducting switches connecting the source with an AC load and first and second flyback diodes, one connected in shunt with each switch to conduct current in the opposite sense to the shunt switch, an inverter switch current sensor, comprising:
    a current transformer having a core of magnetic material;
    first and second primary windings on said core, each connected in series with one of said switches and poled so that current through each switch establishes flux of the same sense in said core;
    third and fourth primary windings on said core, each connected in series with one of said flyback diodes and poled so that the flyback current establishes flux in the core of the sense opposite the switch current flux; and
    a secondary winding on said core for developing an output signal representing the current through said switches.

2. The inverter switch current sensor of claim 1 in which said inverter switches are subject to a shoot-through condition in which both switches conduct at the same time, the flyback currents reducing the remanent flux in the transformer core from the inverter switch currents so that the transformer core does not saturate in a shoot-through condition.

* * * * *